US010260527B2

(12) United States Patent
Steen

(10) Patent No.: US 10,260,527 B2
(45) Date of Patent: Apr. 16, 2019

(54) METHOD AND SYSTEM FOR MITIGATING ROTOR BOW

(71) Applicant: General Electric Company, Schenectady, NY (US)

(72) Inventor: Tod Robert Steen, West Chester, OH (US)

(73) Assignee: General Electric Company, Schenectady, NY (US)

(*) Notice: Subject to any disclaimer, the term of this patent is extended or adjusted under 35 U.S.C. 154(b) by 292 days.

(21) Appl. No.: 15/156,751

(22) Filed: May 17, 2016

(65) Prior Publication Data
US 2017/0335865 A1 Nov. 23, 2017

(51) Int. Cl.
*F01D 25/16* (2006.01)
*F04D 29/66* (2006.01)
(Continued)

(52) U.S. Cl.
CPC ............ *F04D 29/668* (2013.01); *F01D 5/10* (2013.01); *F01D 5/12* (2013.01); *F01D 5/26* (2013.01); *F01D 9/041* (2013.01); *F04D 29/322* (2013.01); *F04D 29/542* (2013.01); *F01D 19/00* (2013.01); *F01D 25/162* (2013.01); *F01D 25/22* (2013.01); *F05D 2220/32* (2013.01); *F05D 2240/50* (2013.01); *F05D 2260/96* (2013.01); *Y02T 50/673* (2013.01)

(58) Field of Classification Search
CPC .............................. F01D 25/164; F01D 25/162
See application file for complete search history.

(56) References Cited

U.S. PATENT DOCUMENTS 3,035,759 A 5/1962 Elmir et al.
3,326,523 A 6/1967 Bobo
(Continued)

FOREIGN PATENT DOCUMENTS

EP 2187072 A1 5/2010
FR 2998609 A1 5/2014
(Continued)

OTHER PUBLICATIONS

English Language PCT Search Report and Written Opinion dated Jul. 6, 2017.

*Primary Examiner* — Woody A Lee, Jr.
(74) *Attorney, Agent, or Firm* — General Electric Company; Pamela A. Kachur

(57) ABSTRACT

A method of damping a vibration in a rotatable member and a damping system for a rotatable machine are provided. The damping system includes one or more damping stages. The rotatable machine further comprising a casing at least partially surrounding the rotor. The casing includes inwardly extending vanes that include a radially outer root, a radially inner distal end, and a stationary body extending therebetween. The one or more damping stages includes a damper supportively coupled between one or more roots of the plurality of vanes and the casing, an air bearing fixedly coupled to one or more distal ends of the plurality of vanes and configured to bear against the rotatable body wherein the damping stage is configured to receive vibratory forces from the rotatable body through the air bearing and the vane and ground the received forces to the casing through the damper.

13 Claims, 4 Drawing Sheets

(51) Int. Cl.
*F01D 5/10* (2006.01)
*F01D 5/12* (2006.01)
*F01D 5/26* (2006.01)
*F01D 9/04* (2006.01)
*F04D 29/32* (2006.01)
*F04D 29/54* (2006.01)
*F01D 19/00* (2006.01)
*F01D 25/22* (2006.01)

(56) References Cited

U.S. PATENT DOCUMENTS

| | | | | |
|---|---|---|---|---|
| 3,519,366 A | * | 7/1970 | Campbell | F01D 9/042 415/138 |
| 4,064,403 A | * | 12/1977 | Miller | F01D 15/10 290/52 |
| 4,979,872 A | * | 12/1990 | Myers | F01D 9/065 403/131 |
| 5,269,651 A | * | 12/1993 | Ostermeir | F01D 9/041 415/134 |
| 6,099,165 A | * | 8/2000 | Tremaine | F01D 25/164 384/535 |
| 6,969,239 B2 | | 11/2005 | Grant et al. | |
| 7,287,957 B2 | | 10/2007 | Jahns et al. | |
| 8,070,435 B1 | * | 12/2011 | Eng | F01D 25/164 384/517 |
| 8,137,071 B2 | | 3/2012 | Caucheteux et al. | |
| 8,459,941 B2 | | 6/2013 | Jasko et al. | |
| 8,511,055 B2 | | 8/2013 | DiBenedetto et al. | |
| 8,974,344 B2 | | 3/2015 | McCune et al. | |
| 9,121,448 B2 | | 9/2015 | Delgado Marquez et al. | |
| 2012/0011824 A1 | * | 1/2012 | Cigal | F01D 9/065 60/39.08 |
| 2013/0186105 A1 | * | 7/2013 | Meacham | F01D 25/28 60/797 |
| 2013/0223990 A1 | | 8/2013 | Cloarec | |
| 2014/0255148 A1 | | 9/2014 | Burns et al. | |
| 2015/0104124 A1 | | 4/2015 | Delgado Marquez et al. | |

FOREIGN PATENT DOCUMENTS

WO 2012097305 A2 7/2012
WO 2015053870 A1 4/2015

* cited by examiner

METHOD AND SYSTEM FOR MITIGATING ROTOR BOW

BACKGROUND

The field of the disclosure relates generally to gas turbine engines and, more particularly, to a method and system for reducing the effects of a bowed rotor during startup of the gas turbine engine and increasing rotordynamic stability against Alford whirl forces.

Gas turbine engines retain an amount of heat after a shutdown. The heat is slowly dissipated over time after the shutdown. During this dissipation period the heat tends to rise in the engine preferentially heating the upper portions of the interior engine components. The temperature gradient created by the rising heat causes the rotor to bow. For example, with the upper half of the rotor at a higher temperature than the lower half of the rotor, the rotor will tend to bow because of differential expansion of the upper and lower halves of the rotor. During a subsequent startup of the engine, the bow can cause a rotor imbalance and associated vibration. Typically, the engine is allowed to idle for a period of time during startup to even the temperatures about the rotor, which permits the rotor bow to be mitigated. However, gas turbine engines sometimes experience a resonant vibratory response to rotor bow at or below idling rotational speeds.

During operation at high torque conditions, a gas turbine can experience a phenomenon called Alford whirl due to tangential aerodynamic forces on the rotor blades. Alford whirl is a well-known phenomenon in the art of rotordynamics. Without sufficient damping of the rotor shaft, the rotor shaft can vibrate in a whirling motion, which may become violent depending on several parameters. A common approach to mitigating Alford whirl is to add damping to the rotor main engine support bearings. In some instances, the damping provided at the bearings is not sufficient to prevent Alford whirl.

BRIEF DESCRIPTION

In one aspect, a damping system for a rotatable machine includes one or more damping stages. The rotatable machine includes a rotor including a first supported end, a second supported end, and a rotatable body extending therebetween. The rotatable machine further includes a casing at least partially surrounding the rotor. The casing includes a plurality of radially inwardly extending vanes. Each vane of the plurality of vanes includes a radially outer root, a radially inner distal end, and a stationary body extending therebetween. The one or more damping stages includes a damper supportively coupled between one or more roots of the plurality of vanes and the casing, an air bearing fixedly coupled to one or more distal ends of the plurality of vanes and configured to bear against the rotatable body wherein the damping stage is configured to receive vibratory forces from the rotatable body through the air bearing and the vane and ground the received forces to the casing through the damper.

In another aspect, a method of damping a vibration in a rotatable member includes supporting the weight of the rotatable member using a first bearing rotatably coupled to a first end of the rotatable member and a second bearing coupled to a second end of the rotatable member. The method further includes receiving a vibratory load from the rotatable member between the first end and the second end using a non-weight bearing, non-contact air bearing device and transmitting the received vibratory load to a casing at least partially surrounding the rotatable member through a damper.

In yet another aspect, a turbofan engine includes a core engine including a multistage compressor including a rotatable member at least partially surrounded by a casing, one or more damping stages extending radially between the rotatable member and the casing. The one or more damping stages includes a stationary vane including a first end and a second end and extending radially between the rotatable member and the casing, a damper coupled to the casing and the first end, and an air bearing fixedly coupled the second end and configured to bear against the rotatable body. The air bearing is configured to receive vibratory forces from the rotatable body and transmit the received forces through the vane to the damper.

DRAWINGS

These and other features, aspects, and advantages of the present disclosure will become better understood when the following detailed description is read with reference to the accompanying drawings in which like characters represent like parts throughout the drawings, wherein.

Figure 1:
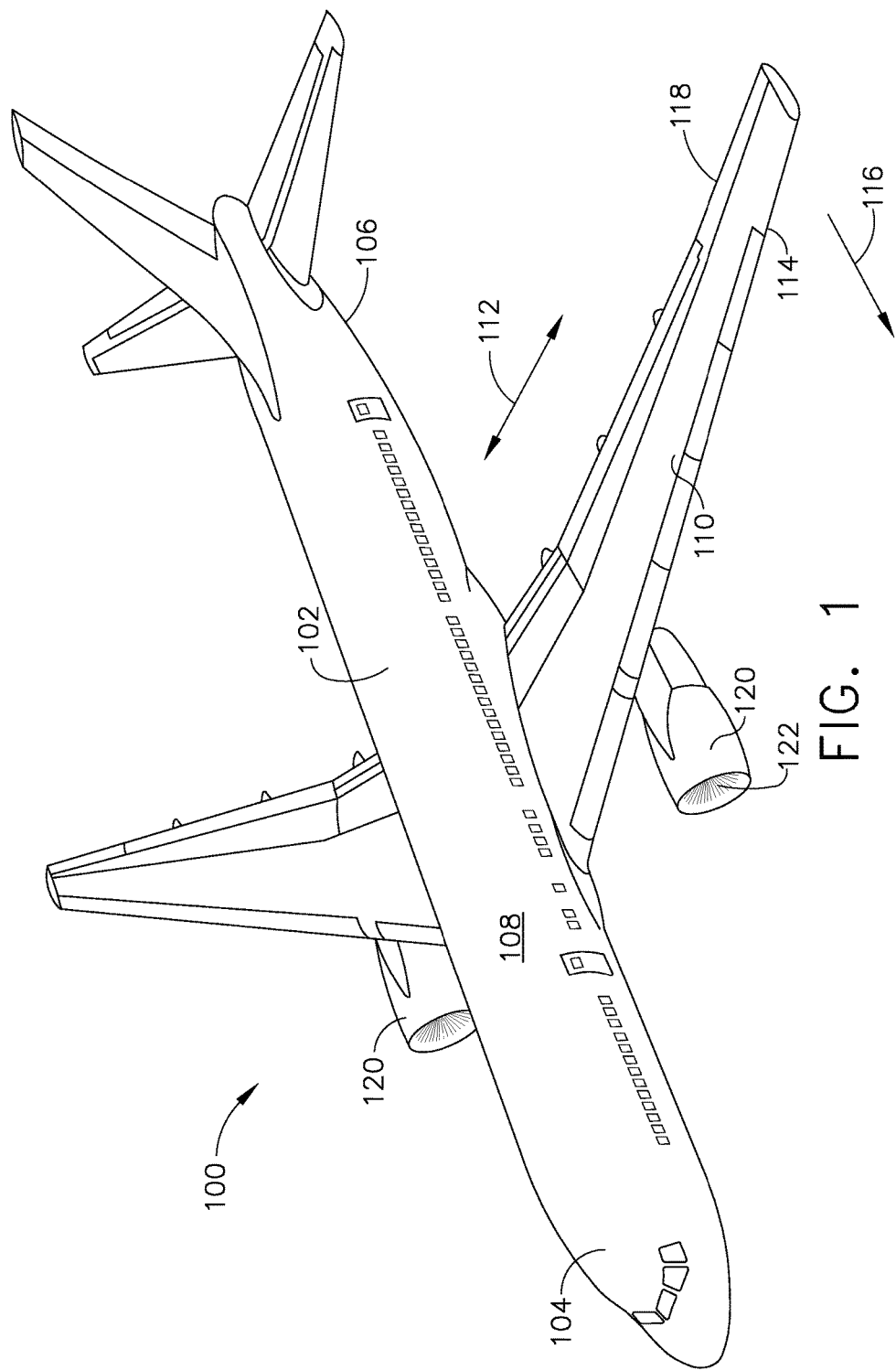
FIG. 1 is a perspective view of an aircraft.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the damping system for a rotatable machine, described herein provide a cost-effective method for mitigating the effects of a bow in a rotor of, for example, a gas turbine engine. Moreover, the damping system facilitates reducing the mode effects of Alford whirl that may develop during operation. The damping system can include one or more damping stages spaced axially along a longitudinal axis of the rotatable machine. Typically, the rotatable machine includes a rotor including a first supported end, a second supported end, and a rotatable body extending therebetween. The first supported end and the second supported end may each be coupled to a respective bearing, which may be embodied in a rolling element type bearing, a journal type bearing, a differential bearing supported by another shaft, and the like. The rotatable machine further includes a casing at least partially surrounding the rotor. The casing includes a plurality of radially inwardly extending vanes wherein each vane of the plurality of vanes includes a radially outer root, a radially inner distal end, and a stationary body extending therebetween. The one or more damping stages includes a damper supportively coupled between one or more roots of the plurality of vanes and the casing, an air bearing fixedly coupled to one or more distal ends of the plurality of vanes and configured to bear against the rotatable body wherein the damping stage is configured to receive vibratory forces from the rotor through the air bearing and the vane and ground the received forces to the casing through the damper. The rotatable body can include a plurality of stages of blades that are spaced circumferentially about the rotatable body and the plurality of stages are spaced axially along the rotatable body. Optionally, the damper is coupled to a root of one of the plurality of vanes positioned approximately midway between the first supported end and the second supported end. In various embodiments, the damping system includes a plurality of damping stages spaced axially along the rotatable body between the first supported end and the second supported end. In some embodiments, the rotatable member includes a plurality of stages, each stage includes a row of vanes extending radially inwardly from the casing and a row of blades extending radially outward from the rotatable member the rows of vanes and the rows of blades in the plurality of stages spaced axially with respect to each other. In other embodiments the damper includes at least one of an integral squeeze film damper and an integral wire mesh damper.

A method of damping a vibration in a rotatable member includes supporting the weight of the rotatable member using a first bearing rotatably coupled to a first end of the rotatable member and a second bearing coupled to a second end of the rotatable member, receiving a vibratory load from the rotatable member between the first end and the second end using a non-weight bearing, non-contact air bearing device, and transmitting the received vibratory load to a casing at least partially surrounding the rotatable member through a damper. The method may further include positioning the air bearing device approximately midway between the first bearing and the second bearing. The method may also include transmitting the received vibratory load to a casing at least partially surrounding the rotatable member through at least one of an integral squeeze film damper and an integral wire mesh damper. The method may also include transmitting the received vibratory load to the casing through a stator vane coupled to the damper. The method may also include positioning the air bearing device proximate an antinode of a vibratory response of the rotatable member when the rotatable member is operating. The method may also include receiving a vibratory load from the rotatable member between the first end and the second end using a non-weight bearing, non-contact air bearing device includes receiving a vibratory load from the rotatable member between the first end and the second end using a plurality of non-weight bearing, non-contact air bearing devices spaced axially along the rotatable member.

A turbofan engine includes a core engine including a multistage compressor including a rotatable member at least partially surrounded by a casing, one or more damping stages extending radially between the rotatable member and the casing. The one or more damping stages includes a stationary vane includes a first end and a second end and extending radially between the rotatable member and the casing. The one or more damping stages further includes a damper coupled to the casing and the first end and an air bearing fixedly coupled the second end and configured to bear against the rotatable body. The air bearing is configured to receive vibratory forces from the rotatable body and transmit the received forces through the vanes to the damper.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. In various embodiments, engine 120 may be embodied in a gas turbine engine in a turbo jet, turbo fan, or turbo prop configuration and may also be embodied in an electric motor having an open propeller or fan configuration. Engine 120 may also be configured as a gas turbine engine/electric motor hybrid. Engine 120 is coupled to at least one of wing 110 and fuselage 102, for example, in a pusher configuration proximate tail 106.

Figure 2:
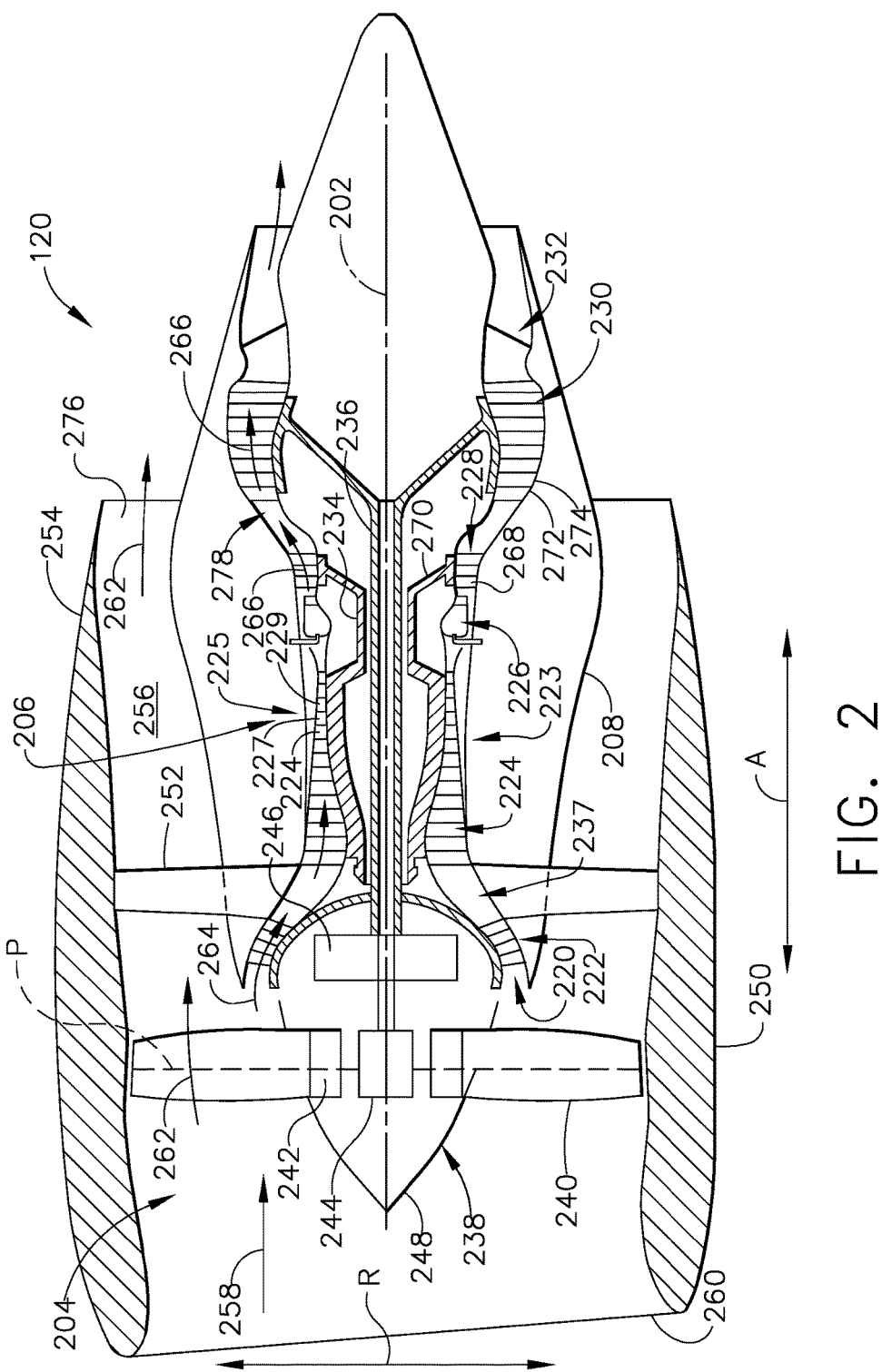
FIG. 2 is a schematic cross-sectional view of the gas turbine engine shown in FIG. 1.

FIG. 2 is a schematic cross-sectional view of engine 120. In the example embodiment, gas turbine engine 120 is embodied in a high-bypass turbofan jet engine. As shown in FIG. 1, turbofan engine 120 defines an axial direction A (extending parallel to a longitudinal axis 202 provided for reference) and a radial direction R. In general, turbofan engine 120 includes a fan section 204 and a core turbine engine 206 disposed downstream from fan section 204.

In the example embodiment, core turbine engine 206 includes an approximately tubular outer casing 208 that defines an annular inlet 220. Outer casing 208 encases, in serial flow relationship, a compressor section including a booster or low pressure (LP) compressor 222 and a high pressure (HP) compressor 224; a combustion section 226; a turbine section including a high pressure (HP) turbine 228 and a low pressure (LP) turbine 230; and a jet exhaust nozzle section 232. A high pressure (HP) shaft or spool 234 drivingly connects HP turbine 228 to HP compressor 224 forming a high pressure rotor 223. A low pressure (LP) shaft or spool 236 drivingly connects LP turbine 230 to LP compressor 222. The compressor section, combustion section 226, turbine section, and nozzle section 232 together define a core air flowpath 237. In various embodiments, HP compressor 224 includes a damping system 225 that includes one or more damping stages 227 including a plurality of radially inwardly extending vanes 229.

In the example embodiment, fan section 204 includes a variable pitch fan 238 having a plurality of fan blades 240 coupled to a disk 242 in a spaced apart relationship. Fan blades 240 extend radially outwardly from disk 242. Each fan blade 240 is rotatable relative to disk 242 about a pitch axis P by virtue of fan blades 240 being operatively coupled to a suitable pitch change mechanism (PCM) 244 configured to vary the pitch of fan blades 240. In other embodiments, pitch change mechanism (PCM) 244 configured to collectively vary the pitch of fan blades 240 in unison. Fan blades 240, disk 242, and pitch change mechanism 244 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Disk 242 is covered by rotatable front hub 248 aerodynamically contoured to promote an airflow through fan blades 240. Additionally, fan section 204 includes an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass airflow passage 256 therebetween.

During operation of turbofan engine 120, a volume of air 258 enters turbofan engine 120 through an associated inlet 260 of nacelle 250 and/or fan section 204. As volume of air 258 passes across fan blades 240, a first portion 262 of volume of air 258 is directed or routed into bypass airflow passage 256 and a second portion 264 of volume of air 258 is directed or routed into core air flowpath 237, or more specifically into LP compressor 222. A ratio between first portion 262 and second portion 264 is commonly referred to as a bypass ratio. The pressure of second portion 264 is then increased as it is routed through high pressure (HP) compressor 224 and into combustion section 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stator vanes 268 that are coupled to an inner casing 278 and HP turbine rotor blades 270 that are coupled to HP shaft or spool 234, thus causing HP shaft or spool 234 to rotate, which then drives a rotation of HP compressor 224. Combustion gases 266 are then routed through LP turbine 230 where a second portion of thermal and kinetic energy is extracted from combustion gases 266 via sequential stages of LP turbine stator vanes 272 that are coupled to inner casing 278 and LP turbine rotor blades 274 that are coupled to LP shaft or spool 236, which drives a rotation of LP shaft or spool 236 and LP compressor 222 and/or rotation of fan 238.

Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass airflow passage 256 before it is exhausted from a fan nozzle exhaust section 276 of turbofan engine 120, also providing propulsive thrust. HP turbine 228, LP turbine 230, and jet exhaust nozzle section 232 at least partially define a hot gas path for routing combustion gases 266 through core turbine engine 206.

During operation, the tangential Alford forces increase as the gas turbine is operated at higher speeds or power settings. If sufficient damping is not provided by the engine structure, the bearings, or bearing dampers, the engine may experience a forward whirl condition leading to excessive vibrations and possible leading to engine stall and/or damage to the engine.

Figure 3:
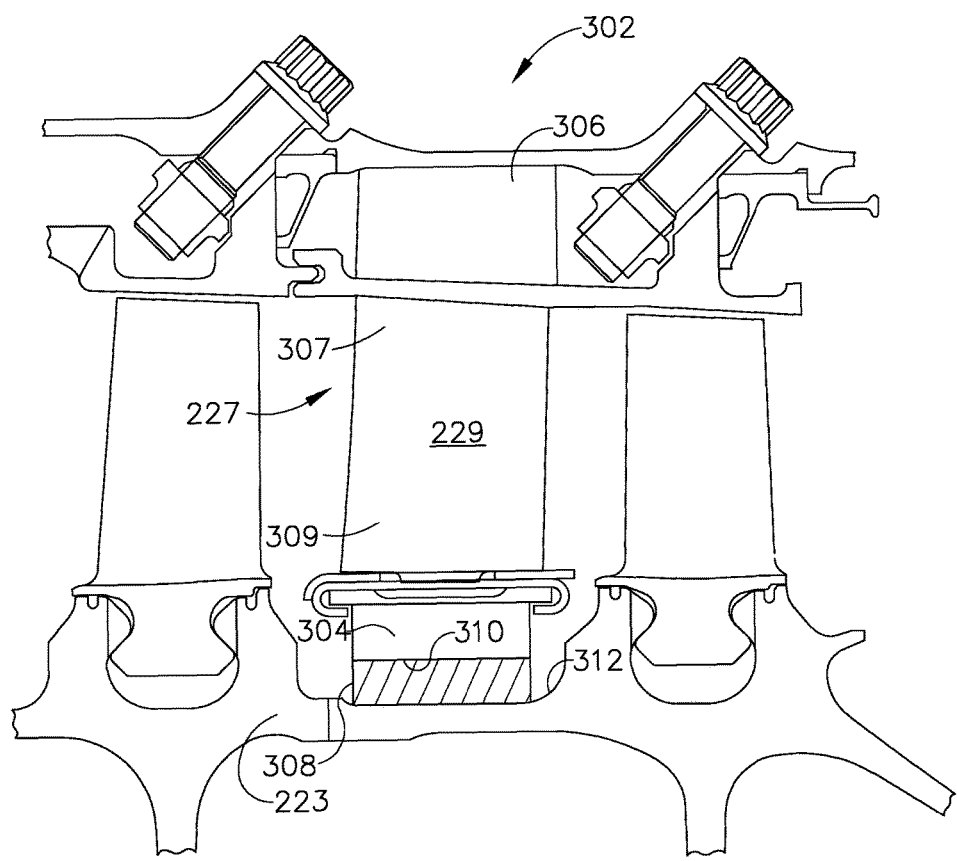
FIG. 3 is a schematic side elevation view of a portion of the damping system shown in FIG. 2.

FIG. 3 is a schematic side elevation view of a portion 302 of damping system 225 (shown in FIG. 2). In the example embodiment, damping system 225 includes one or more damping stages 227 including a plurality of radially inwardly extending vanes 229. Vanes 229 are coupled between an air bearing device 304 and a damping device or damper 306. In some embodiments, damper 306 is embodied in an integral squeeze film type damper. In other embodiments, damper 306 is embodied in an integral wire mesh type damper. Integral wire mesh damper 306 may be formed of a variety of materials, such as steel, Inconel, aluminum, copper, tantalum, platinum, polypropylene, nylon, polyethylene, and the like. The density and dimensions of the integral wire mesh damper 306 can be adjusted to meet a particular design application. Damper 306 is fixedly coupled to inner casing 278 and provides support for a respective vane 229 through a root 307 of vane 229. In various embodiments, each vane 229 includes an air bearing device 304 coupled to a distal end 309 of vane 229, which is configured to generate a film 308 of air or other fluid between a radially inner face 310 of air bearing device 304 and a radially outer surface 312 of high pressure rotor 223. In other embodiments, a plurality of vanes 229 may be ganged circumferentially into a plurality of sectors. Each sector may then use a common air bearing device 304. Providing vanes 229 in sectors permits a more structurally stiff and strong vane component.

During operation, rotor 223 may acquire a bow due to uneven cooling of rotor 223 during a previous shutdown operation. As engine 120 is started for another operating cycle, the bow may cause a vibration in a frequency range that is resonant during low engine rotational speeds, such as approximately a ground idle speed. For example, the vibration may be resonant in a frequency range that is below idle speed, at approximately idle speed, and above idle speed. Typically, a bow in rotor 223 can be mitigated by operating engine 120 at a relatively low idle speed for a period of time. However, if the resonant frequency of rotor 223 occurs as low as the idle speed, rotor 223 will vibrate excessively while engine 120 is being operated to mitigate the bow. To permit such operation, damping stages 227 absorb at least a portion of the vibrational energy generated by operating rotor 223 at a ground idle speed for rotor bow mitigation.

Additionally, damping stages 227 reduce an amount of time required to air motor engine 120 prior to starting by reducing an amplitude of the vibration response at the mode, which facilitates preventing seal and/or rotor to stator rubs.

Figure 4:
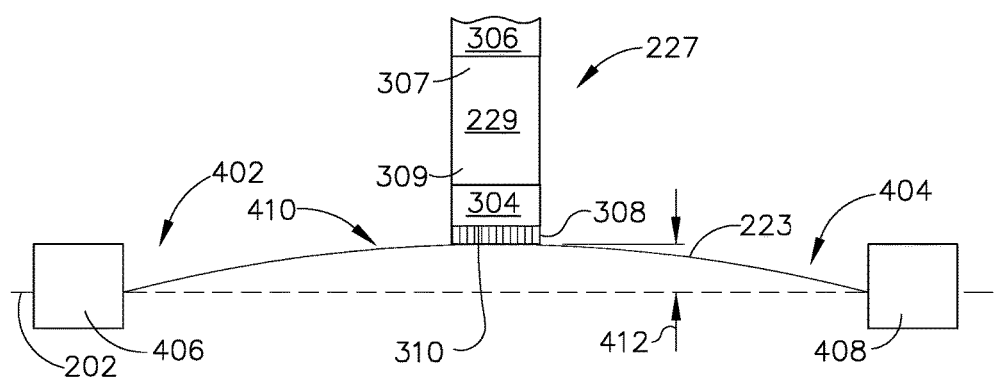
FIG. 4 is a schematic side view of the rotor shown in FIG. 2 and one damping stage of the damping system shown in FIG. 2.

FIG. 4 is a schematic side view of rotor 223 and one damping stage 227 of damping system 225 (shown in FIG. 2). In the example embodiment, rotor 223 includes a first supported end 402 and a second supported end 404 that are each coupled to a respective engine bearing 406 and 408. A bow 410 in rotor 223 is characterized by a displacement of rotor 223 from a normal rotational centerline of rotor 223, which is typically coincident with longitudinal axis 202. An amount of bow is respective of a distance 412. In some embodiments, damping stage 227 is positioned approximately midway between first supported end 402 and second supported end 404. In other embodiments, a plurality of damping stages 227 are spaced axially along rotor 223 between first supported end 402 and second supported end 404. Additional bearings may be positioned at various other locations than at first supported end 402 and at second supported end 404. For example, shafts 234, 236 may be supported at any number of locations.

During operation, in one embodiment, engine bearings 406, 408 support, for example, rotor shaft 234. In another embodiment, engine bearings 406, 408 support, for example, rotor shaft 236. An oil film flows around engine bearings 406, 408 to lubricate and cool engine bearings 406, 408. As described above the tangential Alford forces increase as the gas turbine is operated at higher speeds or power settings. A rotor instability may occur when the rotor speed is increased to a point where the tangential Alford forces on the rotor become large enough to overcome the damping provided by the rotor support and/or static structure of engine 120. If sufficient damping is not provided by the engine structure, the bearings, or bearing dampers, the engine may experience a forward whirl condition leading to excessive vibrations and possible leading to engine stall and/or damage to the engine. If there is sufficient damping within the system such as provided by damping system 225, shaft 234 or 236 can be returned to its normal position and stability.

Although, described in relation to high pressure compressor 224, damping system 225 may be used on other bladed components of engine 120, such as, but not limited to booster or low pressure (LP) compressor 222, high pressure (HP) turbine 228, and low pressure (LP) turbine 230.

Specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A damping system for a rotatable machine, the damping system comprising one or more damping stages, the rotatable machine comprising a rotor comprising at least a first supported end, a second supported end, and a rotatable body extending therebetween, the rotatable machine further comprising a casing at least partially surrounding said rotor, said casing comprising a plurality of radially inwardly extending vanes, each vane of the plurality of vanes comprising a radially outer root, a radially inner distal end, and a body extending therebetween, said one or more damping stages comprising:
    at least one of said plurality of vanes having a damper means supportively coupled between said radially outer root and said casing; and
    at least one of said plurality of vanes having an air bearing fixedly coupled to said radially inner distal end of said at least one of said plurality of vanes and configured to bear against said rotatable body,
    said damping stage configured to receive vibratory forces from said rotatable body through said air bearing and said vane and ground the received forces to the casing through the damper.

2. The system of claim 1, wherein said first supported end and said second supported end are each coupled to a respective bearing.

3. The system of claim 2, further comprising one or more supported positions between said first supported end and said second supported end.

4. The system of claim 1, wherein said rotatable body comprises a plurality of stages of blades, said blades of each said plurality of stages of blades spaced circumferentially about said rotatable body and said plurality of stages of blades spaced axially along said rotatable body.

5. The system of claim 1, wherein said damper means is positioned approximately midway between said first supported end and said second supported end.

6. The system of claim 1, wherein said damping system comprises a plurality of damping stages spaced axially with respect to said rotatable body between said first supported end and said second supported end.

7. The system of claim 1, wherein said damper means comprises at least one of an integral squeeze film damper and an integral wire mesh damper.

8. The system of claim 1, wherein said rotatable body comprises at least one of a gas turbine engine compressor rotor and gas turbine engine turbine rotor.

9. A rotatable machine comprising:
    a core engine including a multistage compressor comprising a rotatable body at least partially surrounded by a casing;
    one or more damping stages extending radially between said rotatable body and said casing, said one or more damping stages comprising:
    a stationary vane comprising a first end and a second end and extending radially between said rotatable body and said casing;
    a damper means coupled to said casing and said first end; and
    an air bearing fixedly coupled to said second end and configured to bear against said rotatable body,
    said air bearing configured to receive vibratory forces from said rotatable body and transmit the received forces through said stationary vane to said damper.

10. The rotatable machine of claim 9, wherein said rotatable body has a first supported end and a second supported end each coupled to a respective bearing.

11. The rotatable machine of claim 9, wherein said damper means is coupled to said first end at a root of one of said plurality of stationary vanes positioned approximately midway along a first rotatable body.

12. The rotatable member of claim 9, wherein said one or more damping stages comprises a plurality of damping stages spaced axially with respect to said rotatable body.

13. The rotatable machine of claim 9, wherein at least one damping stage of said one or more damping stages are spaced axially with respect to said rotatable body proximate respective antinodes of a vibratory response of the rotatable member when the rotatable member is operating.

* * * * *